March 20, 1956    E. B. SACKETT ET AL    2,738,707
DESK TYPE STEREOSCOPE
Filed May 16, 1952
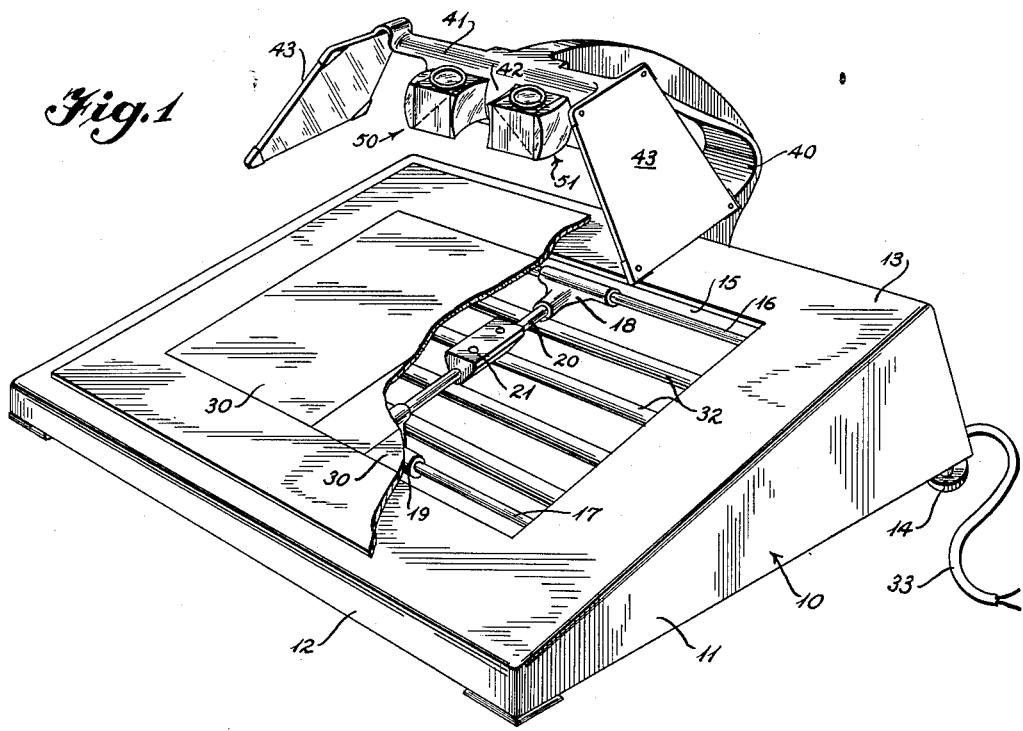
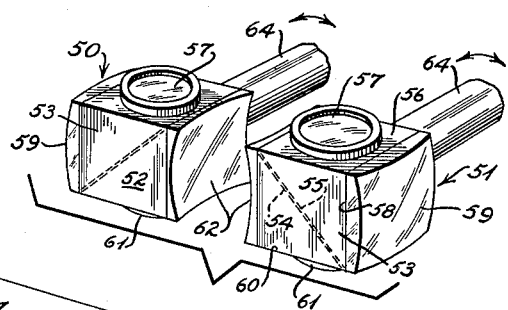
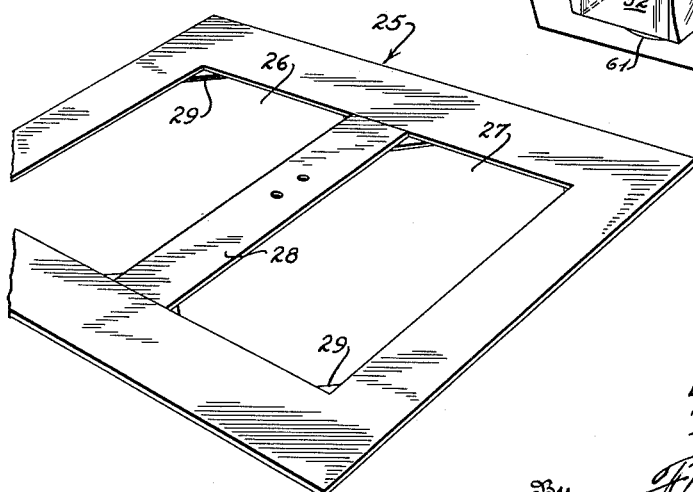
Inventors
Edward B. Sackett
Thomas D. Seymour
By F. Schmitt
Walter S. Paul
Attorneys

United States Patent Office 2,738,707
Patented Mar. 20, 1956

2,738,707

DESK TYPE STEREOSCOPE

Edward B. Sackett, Vienna, Va., and Thomas D. Seymour, Hyattsville, Md.

Application May 16, 1952, Serial No. 288,363

1 Claim. (Cl. 88—29)

(Granted under Title 35, U. S. Code (1952), sec. 266)

This invention relates to stereoscopes with special reference to stereoscopes suitable for rapid photograph interpretation.

Particularly in examination and interpretation of aerial photographs for military purposes, it is of importance that the equipment produce a clear image of detail with low eye fatigue, since, in important projects, eye viewing extends to as high as 70% of the working day. It is important also that the adjustment means of the equipment be simple and positively actuated, that there be a large field of vision, that the photographic detail may be capable of enlargement at will, and that the need for constant realignment be reduced.

The invention, generally stated, includes a stereoscope having a light permeable picture support, a base beneath the support on which a bank of lights is mounted, means for adjusting the support with reference to the base, and two sets of stereoscope lenses, one for normal picture examination and the other for magnified view examination.

The objects of the invention are to provide a stereoscope which is capable of translucent illumination of the photograph, which is susceptible to positive and simple adjustment, which is capable of magnification of detail, which has a relatively large field of vision and which produces a clear image with reduced light loss.

Other objects and many of the attendant advantages of this invention will be appreciated on reference to the following detailed description when considered in connection with the accompanying drawings wherein:

Fig. 1 is a view in perspective showing the general arrangement of the stereoscope;

Fig. 2 is a detail view of the lens system; and

Fig. 3 is a detail view of the adjustment plate.

Referring to Fig. 1 there is shown a casing 10 made of any suitable opaque material, the casing having forwardly converging side edges 11, a narrowed front edge 12, and a flat upper base plate 13 inclined forwardly for easy inspection. A thumb screw 14 permits adjustment of the base plate to suit picture inspection requirements, the preferred adjustment being such as to reduce fatigue resulting from bending over the work.

The base plate is provided with a large square opening 15 similar in outline to the plate edges and adjacent the front and rear edges of this opening are placed slide rods 16 and 17 extending from side to side. Slidably mounted on these rods by means of T-shaped slide elements 18 and 19 is slide rod 20, at right angles to slide rods 16 and 17. On rod 20 is mounted a slidable support block 21, there being a straight bore through the block for this purpose.

An adjustment plate 25 having dimensions less than base plate 13 but larger than base plate opening 15 is provided for placement over the base plate opening. Two openings 26 and 27 separated by a narrow bridge strip 28 are made in plate 25, the openings substantially coinciding with the boundaries of opening 15 in base plate 13. The bridge strip 28 is attached by suitable means to slidable support 21 so that, by simple manipulations, the adjustment plate may be moved, within limits determined by the slide rod lengths, in any direction from a central point of adjustment.

The adjustment plate 25, which may be in the form of a metal stamping, is provided with strap supports 29 at the corners of openings 26 and 27 for reception and fastening of picture supporting plates 30. These plates are made of light transmitting material which may be either transparent or translucent, glass plates being satisfactory. Upon these glass plates are secured by any suitable means, as by adhesive tape, the two pictures, such as photographs, or printed sheets and the like, which are to be subjected to stereoscopic analysis.

Within the base 10 and preferably directly beneath the light permeable plates 30 is placed the light source. This may be in the form of a plurality of parallel gas tube lamps 32 attached by any suitable means to the casing walls so as to underlie the plates 30. Closely spaced lamps with translucent walls may be preferable in order to insure an even light distribution through the picture support glass. The lamp input cable is indicated at 33.

The optical system of the stereoscope includes the lens and reflector units and these are mounted over the picture supporting plate by means of the C-bracket 40. This bracket may be of sheet metal and and is attached at one end to the rear edge of the casing 10 about midway between the edge plates 11. The upper end of the C-bracket terminates in a cross arm 41 having a depending web 42, and at either end of this arm is secured a plane reflector 43 with the reflecting surface thereof turned inwardly and downwardly so as to reflect light rays from the illuminated base area to the lens system. It is desirable that the mirror surface be highly reflecting and we have found Chroluminum to be generally satisfactory for use in the described equipment. Chroluminum mirrors are formed by depositing chrominum on a flat mirror base and then applying successively an aluminum reflective coat and a thin silica protective coat. This gives a reflectivity in excess of 85% throughout the visible and near ultra-violet spectrum.

The lens system consists of two lens units 50 and 51, these units being enlarged in Fig. 2 to show the component lens and prism elements. Taking the right eye unit 51, two right angled prisms 52 and 53 are placed back to back on their long sides 54 and 55 and sealed together by a thin transparent cement layer thus forming a rectangular assembly. On the top face of the shorter side 56 of prism 53 a convex lens eyepiece 57 is attached; and on the other shorter face 58 a corrective lens 59, these two lenses together producing a slight magnification of about 1.2.

Similarly, on the shorter face 60 of prism 52 a convex lens eyepiece 61 is mounted, and on the other exposed prism face a concave lens 62 is secured, this lens combination giving a magnification of about 1.75. The two lens units are each provided with a cylindrical support extension 64 which is rotatably movable in bearing openings formed in the support web 42 of the bracket cross arm, where these members are held by suitable frictional or other means. Lens unit 50 is identical with unit 51 but with allochiral modification for reversed direction of the incoming light beams. By manual adjustment the lens units are rotated to secure the proper lens correlation for stereoscopic inspection of the work piece.

In using this equipment the operator, having attached stereoscopic aerial landscape photographs, for example, on the picture support, adjusts the lens units for approximately normal sight examination, that is, with the corrective lenses 59 on the sides facing the mirrors 43. If, on inspection, the view area is improperly included in the field of vision the operator manually shifts the picture holder on its universal support to obtain the desired view location. At this set-up the photogrammetrist has a general brightly illuminated view of a photographic area.

After a first examination of the photograph or other workpiece, should the operator desire greater detailed information, the lens units are rotated 180° to bring eyepiece lenses 61 on top and the magnifying lenses 62 opposite the reflectors 43, thus permitting further study of the selected area in greater detail. By this means a photograph may be readily and quickly inspected for items of interest and immediately replaced if revealing no item of interest, the important views being reinspected under increased magnification. Where, as in the case of professional photogrammetrists, hundreds of photographs are inspected each day, the elements of speed, precision and fatigue are all of highest importance; and by use of the described equipment the speed and precision are both definitely increased and the fatigue reduced.

Obviously, many modifications and variations of the present invention are possible in the light of the above teachings. It is therefore to be understood that within the scope of the appended claim the invention may be practiced otherwise than as specifically described.

The invention described herein may be manufactured and used by or for the Government of the United States of America for governmental purposes without the payment of any royalties thereon or therefor.

What is claimed is:

Picture mounting equipment for stereoscopes comprising a base plate provided with an opening therein, an adjustment plate having plural openings therein adapted for placement over said base plate opening, a universal slide connection between said base and adjustment plate, light permeable picture supporting plates mounted in each opening of said adjustment plate, and a single fixed bank of lamps attached to said base plate and underlying all of the openings in said adjustment plate whereby uniform and fixed illumination for transmission through said picture supporting plates is provided without lamp adjustment said universal slide connection including a block attached centrally of said adjustment plate on the face side thereof and having a bore extending therethrough, slide rods attached to said base plate along the front and rear edges of the base plate opening a single slide mounted on each of said base plate rods, and a single cross rod passing through the block bore and fixed to said block and to each of said slides, whereby said plate may be moved freely to secure accurate optical alinement of the stereoscope.

References Cited in the file of this patent

UNITED STATES PATENTS

| | | |
|---|---|---|
| 1,368,880 | Bettini | Feb. 15, 1921 |
| 1,756,062 | Holst | Apr. 29, 1930 |
| 1,888,054 | Tipecska et al. | Nov. 15, 1932 |
| 1,983,328 | Von Gruber et al. | Dec. 4, 1934 |
| 2,256,178 | Stuart | Sept. 16, 1941 |
| 2,377,509 | Miller | June 5, 1945 |
| 2,387,555 | Bauersfeld | Oct. 23, 1945 |
| 2,534,561 | Silver | Dec. 19, 1950 |
| 2,555,106 | Beazley | May 29, 1951 |
| 2,656,757 | Stern | Oct. 27, 1953 |

FOREIGN PATENTS

| | | |
|---|---|---|
| 463,879 | Great Britain | Apr. 8, 1937 |